March 3, 1970 R. E. JOHNSON 3,498,510
HAIRPIECE SUPPORT BLOCK AND STRETCHER
Filed June 5, 1968 2 Sheets-Sheet 1
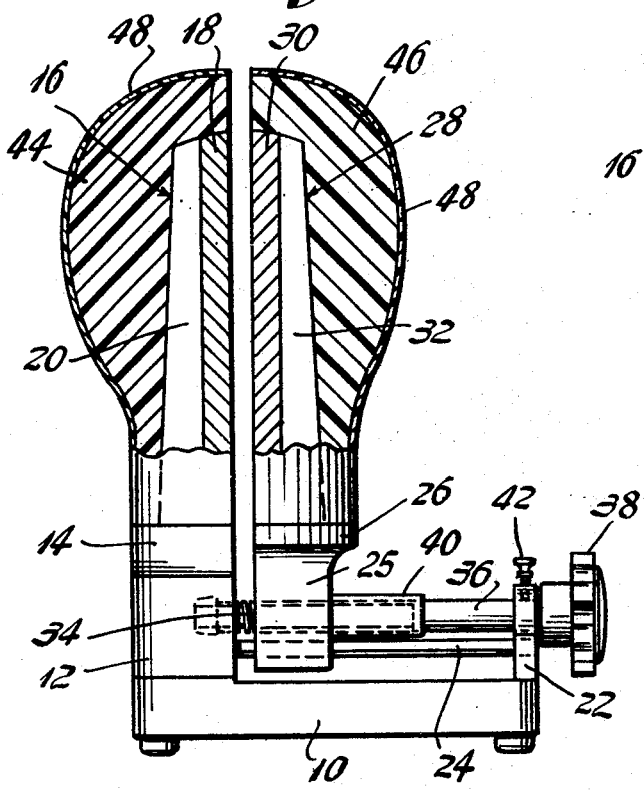
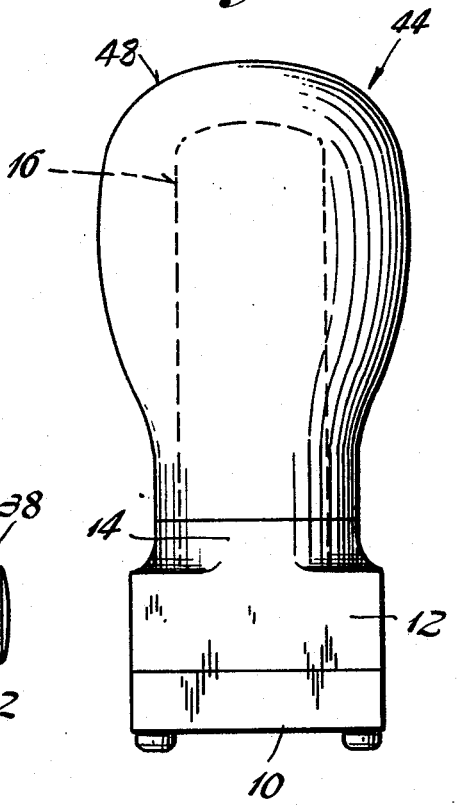
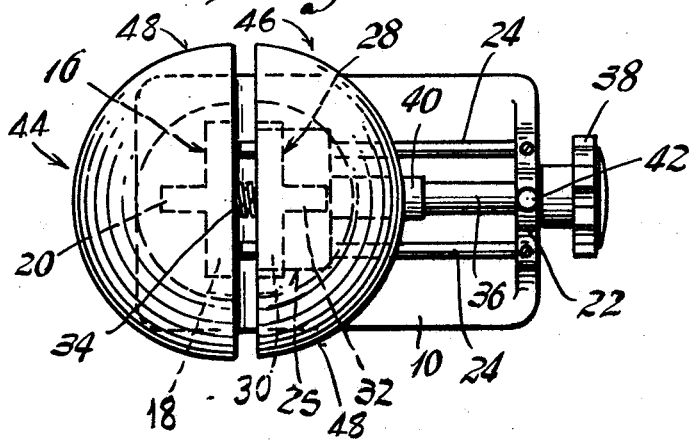
INVENTOR.
Robert E. Johnson
BY
H. Gibner Lehmann
AGENT March 3, 1970 R. E. JOHNSON 3,498,510
HAIRPIECE SUPPORT BLOCK AND STRETCHER
Filed June 5, 1968 2 Sheets-Sheet 2
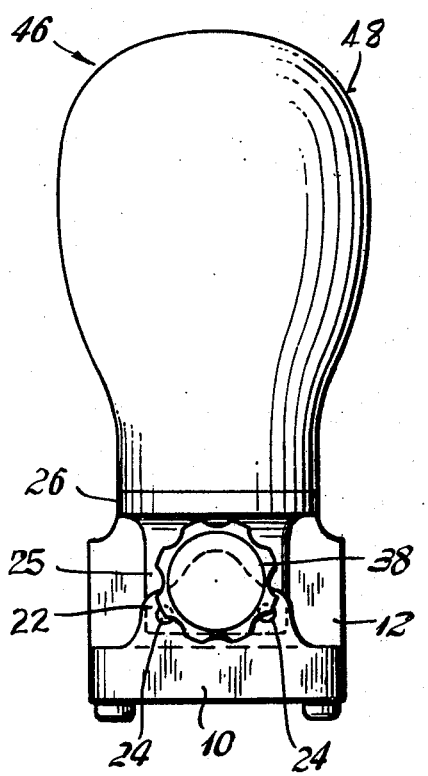
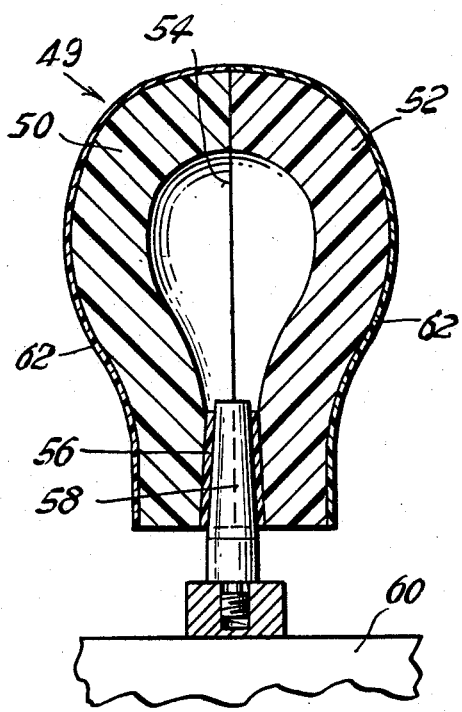
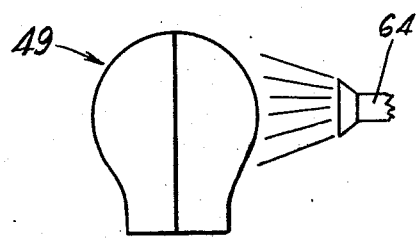
INVENTOR.
Robert E. Johnson
BY
AGENT

United States Patent Office

3,498,510
Patented Mar. 3, 1970

3,498,510
HAIRPIECE SUPPORT BLOCK AND STRETCHER
Robert E. Johnson, 83 Harvest Moon Road,
Easton, Conn. 06612
Filed June 5, 1968, Ser. No. 734,672
Int. Cl. D06c 15/00
U.S. Cl. 223—66             7 Claims

ABSTRACT OF THE DISCLOSURE

A support block for supporting and/or stretching hairpieces, wigs and the like, which is constituted of a semi-rigid thick-walled formation of foam plastic arranged to receive pins and having a desired bulbous outer configuration. A thin self-healing skin of flexible plastic such as vinyl covers the foam configuration and provides an easily-perforated, easy-to-clean, neat-appearing and finished outer surface which is self-healing so that it does not show pin marks.

BACKGROUND

This invention relates to blocks for supporting and stretching wigs, hairpieces, toupees and the like.

It has previously been the practice to produce hairpiece blocks or forms by use of a canvas covering material having a bulbous or hollow shape, which was tightly stuffed with ground cork or sawdust. The stuffed form had a tapered socket by which it could be mounted on a cooperable tapered post of a base, by inserting the post in the socket provided for the purpose. Drawbacks of this prior hairpiece block resided in the staining and wetting through of the canvas and stuffing during washing, shrinking, stretching, waving or other treatment of the hairpiece being supported. The staining and lack of quick drying of the block was undesirable since it was both unsightly and unsanitary; also it often prevented immediate reuse of the block, as in those circumstances where the wet condition could not be tolerated by subsequent work.

SUMMARY

The above disadvantages and drawbacks of prior hairpiece blocks are obviated by the present invention, and one object of the invention is to provide a novel and improved support and/or stretching block of the kind indicated, which is especially clean and sanitary, being also relatively non-staining and quick drying. This is accomplished by the provision of a coated, plastic foam block of the desired configuration, constituted of a semi-rigid, easily pierced molded foam plastic formation having a self-healing flexible plastic skin, the arrangement being such that the block can readily receive pins as used in securing the hairpieces in place, can be easily washed clean after use, will not show the pin marks, is quick drying, relatively impervious to moisture, and not especially susceptible to staining.

Features of the invention reside in the self-healing nature of the flexible skin, which minimizes penetration of water and other liquids applied to the wig and enables the skin to present a closed or continuous exterior, non-pervious surface devoid of pin holes, which is easily wiped clean of stains, chemicals, and the like; the quick and easy penetration of the block by the pins which hold the wig; uniformity in the ease of reception of the pins over the entire area of the block; soft-textured feel of the block surface and ability to form a clinging engagement with the base material of the wig in the presence of water and other liquids (of advantage where stretching is required); as well as lightness of weight and fastness of original color.

Other objects of the invention include the provision of an improved wig block as above characterized, which is of simple construction and low manufacturing cost, involving a minimum of skilled labor; a wig block which involves little servicing, is rugged and durable, and characterized by a long useful life; and a block constituted of synthetics which are resistant to the action of chemicals such as peroxide, bleaching and other agents, to the maximum possible extent.

Other features and advantages will hereinafter appear.

In the drawings:

FIG. 1 is a view partly in vertical section and partly in side elevation, of a two-piece wig support block constituting one embodiment of the invention.

FIG. 2 is a top plan view of the support block of FIG. 1.

FIG. 3 is an elevational view of one end of the support block.

FIG. 4 is an elevational view of the other end of the support block.

FIG. 5 is a vertical sectional view of a one-piece support block, constituting another embodiment of the invention.

FIG. 6 is a diagrammatic representation of a wig-supporting block being sprayed with a self-healing skin in the form of a flexible plastic coating.

Referring first to FIGS. 1–4, there is illustrated an adjustable support structure comprising a generally rectangular base 10 having at one end an upstanding portion 12 including a semi-circular rim 14 and an upright post or core member 16 of T-section including a web portion 18 and a rib portion 20. The rib 20 is preferably tapered as seen in FIG. 1 whereby the top end of the post is of smaller cross section.

The base 10 and portions 12, 14 together with the upstanding post 16 preferably are made integral with each other as when formed of cast iron. At its other end the base 10 has an upwardly projecting bearing portion 22 supporting a pair of horizontal, spaced-apart, parallel guide rods 24 extending above the base and at their inner ends supported by the portion 12. The guide rods 24 constitute a track or slide for a movable member 25 which is drilled to accommodate the rods and is movable along the same toward and away from the portion 12. The member 25 also has a semi-circular rim portion 26 from which there extends upwardly a vertical post or core member 28 of T-section, including a web portion 30 and a tapered rib portion 32.

For the purpose of adjustably shifting the member 25 along the guide rods 24 a screw 34 is provided, having a smooth shank portion 36 supported in the bearing 22 of the base and at its exterior end carrying a knob 38. The inner end of the screw 34 bears in the portion 12 of the base, the screw being parallel to the base 10 and to the guide rods 24.

Slidable on the smooth portion 36 of the screw is a sleeve 40 which is affixed to the member 25. The screw 34 engages internal threads in the member 25, passing through the latter as shown in the figures. A thumb screw 42 threaded into the bearing 22 has its inner end received in an annular groove (not shown) in the smooth screw portion 36, thereby to prevent axial movement of the screw. Also, tightening of the screw 42 will secure the adjusting screw 34 and slide member 25 in any desired adjusted position, as will be understood.

The upright posts 16, 28 and rim portions 14, 26 carry a pair of hairpiece support blocks 44 and 46, each of said blocks being generally shaped to simulate a part of the human head. For example, the block 44 may have a bulbous exterior surface as illustrated, simulating the back portion of the head, whereas the block 46 may have a bulbous or rounded exterior surface simulating generally the forehead. The blocks 44, 46 are cored out or provided with cavities by which they closely fit the upright posts 16, 28. Also, the blocks have bottom rim portions which closely fit and extend flush with the rims 14, 26 of the members 12, 25. The blocks 44, 46 are preferably secured to the posts 16, 28 by a suitable adhesive.

In accordance with the present invention, the blocks 44, 46 are constituted of foam plastic with a continuous outer skin whereby they have special advantages in connection with the supporting of wigs, hairpieces and the like, as well as in connection with the carrying out of different operations on the same. Specifically the blocks 44, 46 are substantially impervious to moisture, readily receptive to the pins used to secure the wigs in place, not readily stained, easily wiped cleaned, sanitary, resistant to chemicals and other liquids utilized in working on the wigs, resistant to heat, somewhat soft to the touch, and substantially color-fast. Moreover, the blocks may be easily fabricated by known manufacturing techniques, and economically produced whereby they have a low manufacturing cost. In furtherance of the invention, the blocks 44, 46 are advantageously constituted of foam polyurethane, using a known molding procedure. One formulation of polyurethane found suitable is that produced by Essex Chemical Corp. under the tradename "Nopcofoam," No. SX160 white. Other polyurethane formulations have also been found satisfactory.

During the molding of the foam plastic blocks 44, 46 a substantially moisture impervious skin is formed, which covers the entire rounded exterior surface of the block. Further, in accordance with the invention there is additionally provided a second or outermost skin means of flexible vinyl plastic formulation, such second skin being preferably sprayed on the block and, in conjunction with the underskin of the foam plastic, having an advantageous self-healing effect by which it does not show pinholes after removal of the pins. This quality of being self-healing is especially important, since it enables the blocks 44, 46 to resist the penetration of moisture to a marked degree whereby they will not become soggy, water-soaked or liquid-soaked during those operations involving the application of hot water or hot liquid solutions to the wigs. Accordingly, after use of the blocks they may be readily wiped clean with a cloth, either with or without a cleaning agent, whereupon the outer surface will be devoid of stains and the like. By virtue of the blocks 44, 46 and the skin 48 thereof being of plastic which, by its very nature has no absorbent fibers, the likelihood of the blocks drying quickly is excellent. The wiping of the skin surface 48 is essentially all that is required to remove most traces of the solutions used in working on the wigs, thereby leaving the blocks in a sanitary and quick-drying condition. The vinyl skin 48 may have a formulation as provided by Essex Chemical Corporation under the designation "#76 Liquid Envelope White 34–93."

Where it is desired to effect a stretching of the wigs, the screw adjustment provided for the member 25 is utilized. Also, such adjustment is utilized to initially match the blocks 44, 46 with the size of the wigs which is being supported thereon.

I have found that the vinyl skin 48 advantageously has a clinging tendency when moist, by which seeks to hold or cling to the wig base as the wig is being pinned in place. This materially aids in holding the wig against slippage, and generally speeds the operations which are to be performed.

Another embodiment of the invention is illustrated in FIG. 5, wherein the wig supporting block 49 is formed of two halves immovably secured to each other, thereby constituting in effect a one-piece block. In this figure, the block halves 50, 52 are similar but exact reversals of each other, that is, one is a left hand configuration and the other is a right hand configuration. The blocks 50, 52 are secured together along a median plane 54, as by use of a suitable adhesive, and are cemented to a tapered bushing or liner member 56 accommodated in a suitable cavity which is formed when the block halves are joined. The liner bushing 56 may be either of metal or of rigid plastic, being arranged to fit over a tapered post or core member 58 of a type well known in the art, shown as supported on a base 60.

The block halves 50, 52 are molded of foam plastic substance such as polyurethane, and have an exterior self-healing flexible vinyl coating or skin 62 similar to that already described above. The skin 62 may be sprayed on the assembled blocks 50, 52, whereby it bridges the seam line or joint 54, as will be understood.

In the showing of FIG. 5 the coatings 62 on the blocks 50, 52 are sectioned to indicate that they are separate from each other. This would occur where the blocks are sprayed separately and thereafter joined together. Where the blocks are first joined and thereafter sprayed with the coating 62 the sectional showing would reveal the hatch lines as all extending in the same direction. For such condition the seam 54 would be bridged and sealed by the spraying of the coating or skin, as can be understood from FIG. 6. In this figure, the block 49 is being sprayed with a vinyl coating from a nozzle 64.

The features and advantages described above in connection with the blocks 44, 46 are also had with the one-piece foam plastic block constituted of the two halves 50, 52 as illustrated in FIG. 5.

It will now be understood from the foregoing that I have provided a novel and improved hairpiece support block construction having numerous features and advantages. The blocks are relatively non-staining, especially clean and sanitary, and quick-drying. They have a flexible self-healing skin surrounding a molded foam plastic formation both of which readily receive pins as used in securing hairpieces in place. The blocks can be easily washed clean after use, and will quickly air dry with little or no showing of pin marks. The blocks are relatively impervious to moisture and not susceptible to staining. The self-healing nature of the flexible skin minimizes penetration of water and other liquids applied to the wig, and enables the blocks to present a closed or continuous exterior, non-pervious surface devoid of pin holes and which is easily wiped cleaned of stains, chemicals and the like. The ease of penetration of the pins is uniform over the entire block surface, which additionally has a soft, textured feel as well as the ability to cling to the base material of the wig in the presence of moisture. The block will retain its original coloring, is simple in construction and characterized by a low manufacturing cost, involving a minimum of skilled labor. It is rugged and durable, and has a long useful life, being constituted of synthetics which are resistant to the action of chemical agents as used in working with wigs, hairpieces and the like.

Variations and modifications are possible, and portions of the improvement may be used without others.

I claim:

1. A support block for wigs, hairpieces and the like, comprising in combination:
   (a) a core member,
   (b) a thick-walled foam plastic body secured to and extending at least partially around said core member,
   (c) said body having a portion shaped to simulate at least part of a human head,
   (d) the walls of said body portion having thickness to effect a large measure of self-support for it and to effectively hold pins pushed into it for the purpose of holding a wig thereon, and
   (e) a thin self-healing plastic skin covering said body portion of the block,
   (f) said skin closing holes from pins which have been inserted in the block portion, after the pins are withdrawn.

2. A support block as in claim 1, wherein the foam plastic is polyurethane.

3. A support block as in claim 1, wherein the skin covering is vinyl.

4. The construction as defined in claim 1, and further including:
 (a) a second core member,
 (b) means for movably mounting the second core member for adjustable positioning with respect to the first core member,
 (c) a second thick-walled foam plastic body secured to and extending at least partially around said second core member,
 (d) said second body having a portion shaped to simulate a part of the human head which is complementary to the part simulated by the said first-mentioned body portion, and the wall thickness of said second body portion being commensurate with that of the first-mentioned body portion.

5. The construction as in claim 4, and further including:
 (a) thin, self-healing plastic skins covering said body portions,
 (b) said skins closing holes from pins which have been inserted in the body portions, after the pins are withdrawn.

6. The construction as defined in claim 1, wherein:
 (a) the block comprises a pair of half-portions joined along a median plane, and
 (b) a thin, self-healing plastic skin covering said half-portions and the seam between the same,
 (c) said skin closing holes from pins which have been inserted in the half portions after the pins are withdrawn.

7. A support block as in claim 1, and further including:
 (a) a thin self-healing plastic skin spray-coated on and covering said body portion of the block,
 (b) said skin closing holes from pins which have been inserted in the body portion, after the pins are withdrawn.

References Cited

UNITED STATES PATENTS

| | | | |
|---|---|---|---|
| 1,581,940 | 4/1926 | Margolin | 223—25 |
| 1,634,051 | 6/1927 | Parsch | 223—25 |
| 3,132,778 | 5/1964 | Leclehart | 223—66 |
| 3,289,823 | 12/1966 | Weiser et al. | 223—66 X |
| 3,300,108 | 1/1967 | Schumer | 223—66 |

MERVIN STEIN, Primary Examiner

G. V. LARKIN, Assistant Examiner

U.S. Cl. X.R.

223—25